United States Patent [19]
Roth

[11] 3,797,294
[45] Mar. 19, 1974

[54] APPARATUS FOR HYDRAULIC ELECTROHYDRAULIC FORMING OF TUBULAR ELEMENTS

[75] Inventor: Donald J. Roth, Chicago Heights, Ill.

[73] Assignee: Continental Can Company, Inc., New York, N.Y.

[22] Filed: Sept. 25, 1968

[21] Appl. No.: 762,522

[52] U.S. Cl. .................................. 72/56, 72/63
[51] Int. Cl. ........................................ B21d 26/12
[58] Field of Search ............. 72/56, 60, 63; 29/421

[56] References Cited
UNITED STATES PATENTS

| | | | |
|---|---|---|---|
| 2,902,962 | 9/1959 | Garvin | 72/60 |
| 3,222,902 | 12/1965 | Brejcha et al. | 72/56 |
| 3,232,085 | 2/1966 | Inoue | 72/56 |
| 3,267,710 | 8/1966 | Inoue | 72/56 |
| 3,338,080 | 8/1967 | Golden | 72/56 |
| 3,394,569 | 7/1968 | Smith | 72/56 |

Primary Examiner—Richard J. Herbst
Attorney, Agent, or Firm—Diller, Brown, Ramik & Wight

[57] ABSTRACT

This disclosure relates to an apparatus for contouring tubular elements, such as can bodies, into conformity with a mold by first subjecting the interior of a tubular element to fluid pressure which expands the tubular element into general conformity with the mold cavity surface, and thereafter discharging electrical energy while the fluid medium is still under pressure to create a momentary shock wave which further expands the tubular element into intimate contact with the cavity surface.

1 Claim, 1 Drawing Figure

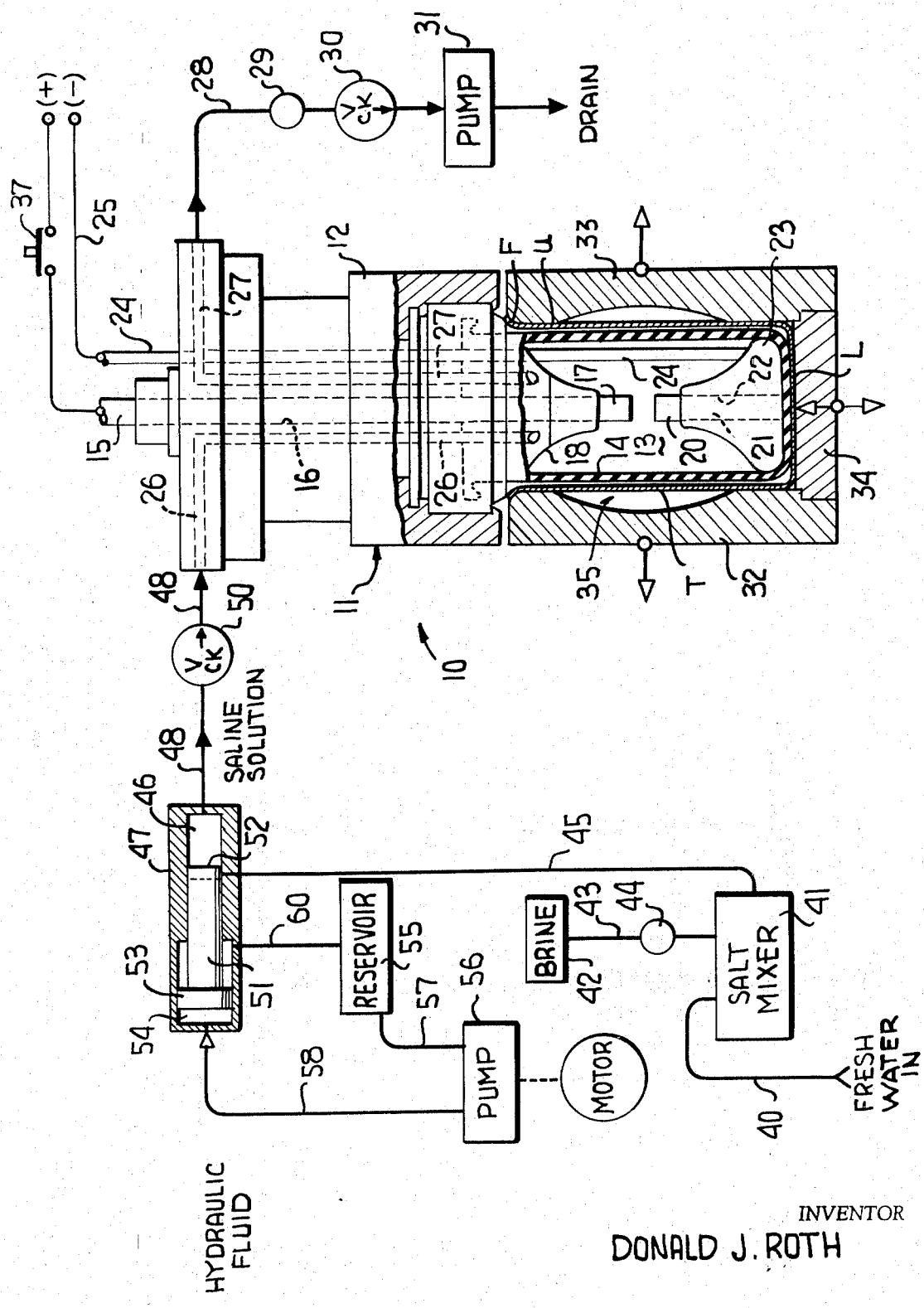

APPARATUS FOR HYDRAULIC ELECTROHYDRAULIC FORMING OF TUBULAR ELEMENTS

A primary object of this invention is to provide a novel apparatus for forming tubular elements by means of both hydraulic and electrohydraulic force generating means, the apparatus includes a mold cavity having a surface into conformity with which a tubular element is forced under the influence of a pressurized hydraulic medium, and thereafter means are provided for discharging electrical energy internally of the tubular element while the hydraulic medium is still under pressure to create a momentary shock wave which forces the tubular element into intimate contact with the mold cavity surface. The relatively slow application of the hydraulic pressure allows air between the tubular element and the mold cavity to escape between abutting surfaces of split molds defining the cavity, thereby avoiding the problem of forming a vacuum between the tubular element and the mold cavity as in conventional apparatuses. If the tubular element is constructed from a material which is strain rate sensitive, the slow movement or flow of the metal will permit such elements to be formed under the combination of hydraulic and subsequently electrohydraulic pressures which could not be done by electrohydraulic pressure alone.

The combination of hydraulic and electrohydraulic forces also increases the efficiency of the electrohydraulic discharge when this occurs at elevated pressures, and there is therefore provided a proportional increase in electrode and insulator life.

With the above and other objects in view that will hereinafter appear, the nature of the invention will be more clearly understood by reference to the following detailed description, the appended claimed subject matter, and the view illustrated in the accompanying drawing.

In the drawing:

The drawing is a schematic view of an apparatus constructed in accordance with this invention, and illustrates a flexible chamber in which is housed a pair of coaxial electrodes, means for pressurizing a fluid medium to expand the chamber and force a tubular element into general conformity with a mold cavity surface, and means for thereafter discharging electrical energy across the electrode-electrode gap to intimately conform the tubular element to the cavity details.

A novel apparatus constructed in accordance with this invention is fully illustrated in the drawing, and is generally designated by the reference numeral 10. The apparatus 10 includes an electrohydraulic transducer 11 which includes an upper rigid supporting portion 12 and a lower flexible reforming chamber 13 defined by a flexible bag-like element 14. An electrode 15, which is suitably insulated, projects downwardly through a bore 16 of the supporting portion 12 and terminates in a noninsulated end portion 17 projecting outwardly of a reflector 18 which is suitably supported by the supporting portion 12. A noninsulated end portion 20 of another electrode 21 is positioned in axial aligned spaced relationship to the electrode end portion 17. The electrode 21 is conventionally secured in a bore 22 of an electrically conductive metallic reflector 23 which is in turn suspendingly supported by a plurality of electrical conductive metallic suspension rods or pillars 24, only one of which is illustrated and is shown connected to ground by a conductor 25. The upper end portion of the pillar 24 which passes through the supporting portion 12 is likewise suitably insulated.

A passage 26 is provided in the supporting portion 12 and the reflector 18 for introducing a fluid medium, which is preferably a low (4 percent) concentrate saline solution, into the chamber 13 prior to a discharging operation. A passage 27 is likewise provided in the supporting portion 12 and the reflector 18 for purging the chamber 13 after a discharging operation by means of a conduit 28, a valve 29, a check valve 30 and a pump 31 connected to a suitable drain.

The supporting portion 12 is preferably mounted in a stationary position and three die bodies 32 through 34 which form a die cavity 35 are closed as shown to position a tubular element T, such as a metallic, plastic, paper or similar container having a closed lower end L and an upper open end U in external telescopic relationship to the chamber means 13 and internal telescopic relationship to the cavity 35. The cavity surface (unnumbered) is shown as being smooth, but it is to be understood that the surface is cut, grooved or etched to impart like markings to the exterior surface of the tubular element T. The cavity surface may, for example, include a plurality of minute circumferential grooves which would impart a "beer-barrel" exterior to the finally formed element. The cavity 35 may therefore be considered to be an embossing cavity whose surface is appropriately contoured to emboss and/or otherwise impress minute details upon the exterior surface of the tubular element T.

The mold bodies 32, 33 are of a semi-annular configuration and when closed they define an annular cavity which is closed at its lower end by the die body 34 which is of a circular configuration. The upper open end of the cavity 35 is closed by an annular shoulder 36 which cooperates with shoulders (unnumbered) of the dies 32, 33 to clamp a flange F of the tubular element T therebetween.

The tubular element T is positioned as shown in the drawing by being first supported on the die body 34 when the latter is positioned beneath the bag-like element 14 a sufficient distance to position the tubular element T thereon in coaxial relationship to the chamber 13. The mold bodies 32, 33 are in their open positions to the left and right respectively of that illustrated. Thereafter conventional means (not shown), such as a fluid motor or a cam and cam follower, are actuated to move the die body 34 upwardly until the flange F contacts the shoulder 36. Thereafter conventional means of the type associated with the die body 34 are operated to move the die bodies 32, 33 to the illustrated closed position at which time the chamber 13 can be filled with the fluid medium through the passage 26 incident to a two phase reforming operation which initially requires the gradual pressurizing of the fluid medium in the chamber which expands the tubular element T to the general outline of the cavity 35 after which a switch 37 connected between the positive side of the stored electrical energy source and the electrode 15 is closed to create an electrical discharge across the gap of electrodes 15, 21, causing the generation of a momentary shock wave which forces the exterior surface of the tubular element into intimate contact with the mold surface.

The first phase of the reforming operation consists in conducting the fluid medium, such as fresh water at line pressure, to a tank 41 by a conduit 40 to which is added saline by gravity from a brine tank 42, a conduit 43 and a valve 44. The fluid medium is thereafter conducted from the tank 41 via a conduit 45 to a chamber 46 of a fluid isolator or intensifier 47 having an outlet connected to the passage 26 by a conduit 48 and a check valve 50. The intensifier 47 functions as the means to pressurize the fluid medium in the chamber 13 after the latter has been filled and to expand the bag-like element 14 radially outwardly under hydraulic pressure to bring the tubular element into conformity with the cavity 35 prior to the electrical discharge heretofore noted.

The intensifier 47 houses a double-ended piston 51, one end 52 of which in part defines the chamber 46 and the other end 53 is positioned in a chamber 54. Hydraulic fluid, such as oil, is conducted from a reservoir 55 to a motor driven pump 56 by a conduit 57. The pump 56 conducts the oil or similar fluid to the power side of the piston 51 into the chamber 54 through a conduit 58 which moves the piston 51 to the right thereby pressurizing the interior of the chamber 13. During the left-to-right movement of the piston 51 hydraulic fluid in the chamber 54 to the right of the piston head 53 is conducted to the reservoir 55 by a conduit 60.

Assuming that the apparatus 10 has been loaded in the manner heretofore described and that the chamber 13 and the die bodies 32 through 34 are in the positions shown, the bag-like element 14 of the chamber 13 is filled by line pressure (30 p.s.i.) from the tank 31, the conduit 45, the chamber 46, the conduit 48, the check valve 50, and the passage 26. At this time the piston 51 is in its leftmost position at which point the end face 52 thereof is just to the left of the port (not shown) connecting the conduit 45 to the chamber 46. During this initial filling stage the valve 29 is, of course, closed.

The pump 56 is then operated automatically or manually by starting the motor which conducts the hydraulic fluid from the reservoir 55 and delivers the same over the flow path heretofore described to the chamber 54 thereby causing the piston 51 to move from left-to-right at which point the end face 52 moves from the phantom outline position to and beyond the solid outline position closing the port from the conduit 45 and pressurizing the interior of the chamber 13 to between 300–3,000 p.s.i., but preferably between 600–800 p.s.i. During this gradual increase in the pressure of the fluid medium the bag-like membrane 14 progressively expands radially outwardly and forces the tubular element T to the general configuration of the cavity 35. However, if the surface of the cavity 35 is provided with minute details the exterior of the tubular element T will not intimately conform thereto under relatively lower pressures as, for example, between 600–800 p.s.i., and details will not be completely and/or accurately transferred to the exterior surface of the tubular element even though the latter is now permanently contoured to the general configuration of the cavity 35 under only hydraulic pressure.

While the fluid medium within the chamber 13 is still under pressure, again preferably between 600–800 p.s.i., the switch 37 is closed which causes the electrical energy stored in a capacitor or an inductor to be rapidly discharged across the end portions 17, 20 of electrodes 15, 21, respectively. This discharge causes a rapidly expanding plasma bubble at the electrode-electrode gap, and the interaction of the expanding bubble and the nearly incompressible fluid medium surrounding it causes a hydraulic shock wave which moves outwardly through the fluid medium causing the bag-like element 14 to expand further and force the tubular element T into intimate relationship with the cavity 35 whereupon all details are completely and accurately transferred from the cavity surface to the exterior of the tubular element.

After the tubular element T has been reformed the valve 29 is opened and the pump 31 is operated to reduce the pressure in the chamber 13 and remove the fluid medium therefrom. During the operation of the pump 31 the port from the conduit 45 to the chamber 46 remains closed and any remaining fluid medium in the chamber 46, the conduit 48 and the passage 26 eventually flows by gravity and/or the action of the pump 31 into the chamber 13. The pump 31 is operated to reduce the pressure of the fluid medium in the chamber 13 below atmospheric pressure at which time the bag-like element 14 progressively collapses radially inwardly to generally the phantom outline position thereof which facilitates the removal of the reformed tubular element upon the opening of the die bodies 32, 33 and the lowering of the die body 34.

The piston 51 is thereafter returned from its rightmost position to its leftmost position by, for example, reversing the drive of the motor to withdraw hydraulic fluid through the conduit 58 and establish a higher pressure on the right-hand side of the piston 53 to return the piston 51 to the left at which time the port of the conduit 45 is again opened to initiate another operation upon the closing of the valve 25.

While preferred forms and arrangements of parts have been shown in illustrating the invention, it is to be clearly understood that various changes in details and arrangement of parts may be made without departing from the spirit and scope of the invention as defined in the appended claimed subject matter.

I claim:

1. Apparatus for reforming tubular elements comprising means defining a mold cavity having a surface into conformity with which a tubular element is adapted to be forced, means for expanding the tubular element radially outwardly toward the mold cavity, said expanding means includes expansible chamber means in internal relationship to the tubular element, means for pressurizing the fluid medium in said chamber means thereby expanding the latter and the tubular element, means for generating a momentary shock wave internally of the tubular element after the latter has been expanded to force the tubular element into intimate contact with the mold surface, said generating means includes means for discharging electrical energy internally of the tubular element thereby creating the momentary shock wave, said discharging means includes electrodes in spaced relatiohship in said chamber means, said chamber means being a flexible generally tubular bag-like member, means for introducing liquid into and removing liquid from said tubular bag-like member, said last-mentioned means being respective inlet and exhaust ports, said pressurizing means being in fluid communication with said inlet port, said pressurizing means further including a double-ended piston reciprocably housed with ends thereof in respective large and small chambers, said small chamber being in fluid communication with said inlet port and with a source of liquid adapted to be pressurized during reciprocable motion of said piston, means for reciprocating said piston, said last mentioned means including ports at opposite sides of a larger piston head of said piston in fluid communication with a pump and reservoir.

* * * * *